United States Patent [19]

Buchner

[11] 4,337,790
[45] Jul. 6, 1982

[54] FILTERING DEVICE

[75] Inventor: Daniel C. Buchner, Wallaceburg, Canada

[73] Assignee: Waltec, Inc., Ontario, Canada

[21] Appl. No.: 203,232

[22] Filed: Nov. 3, 1980

[30] Foreign Application Priority Data

Jul. 21, 1980 [CA] Canada .................................. 356640

[51] Int. Cl.³ .............................................. E03D 1/32
[52] U.S. Cl. .................................................... 137/550
[58] Field of Search ........................................ 137/550

[56] References Cited

U.S. PATENT DOCUMENTS

| 306,503 | 10/1884 | Maybury | 210/429 |
|---|---|---|---|
| 2,072,555 | 3/1937 | Hengesbach et al. | 137/550 |
| 2,093,398 | 7/1935 | Arvintz | 210/429 X |
| 2,247,590 | 7/1941 | Strong | 137/550 |
| 2,335,899 | 8/1941 | Arvintz | 210/429 |
| 2,642,261 | 6/1953 | Gates | 137/550 |
| 3,176,711 | 6/1961 | Borg et al. | 137/454.5 |
| 3,576,199 | 4/1971 | Schoepe | 137/550 |
| 3,811,006 | 5/1974 | Burnall | 137/550 |
| 3,835,884 | 9/1974 | Ishikawa | 137/550 |

FOREIGN PATENT DOCUMENTS 1007141  3/1977  Canada .

Primary Examiner—Theodore A. Granger
Attorney, Agent, or Firm—Smart & Biggar

[57] ABSTRACT

Disclosed is a filter for use in a faucet of the type having a removable cartridge member receivable in an underbody member, the cartridge member carrying a cam member, at least one cam follower member and a valve member actuated by the cam follower member upon movement of the cam to control fluid communication between a spout and a source of water. The filter member is removably attached to a projection on the valve member and moves with it within a passage in the underbody member through which water flows from the source. By this means, large particles are prevented by the filter from entering the faucet. The filter comprises an inner annular member, an outer annular ring member, and a plurality of flat web connecting members extending radially between the inner and outer annular members. The inner annular member has a through hole which tapers from a first diameter to a second diameter so that the inner annular member can be forced over a head portion on the projection whereafter it is latched thereon. Should the filter become clogged, it is easily removed and cleaned.

3 Claims, 3 Drawing Figures

FILTERING DEVICE

BACKGROUND OF THE INVENTION

This invention relates to a filter member for use in a faucet of the type having a removable cartridge member receivable in an underbody member.

It is known to use filters in water supplies to remove particles which might damage a faucet, but such filters are mounted in the supply line prior to the faucet and are difficult to remove the cleaning. The present invention provides a filter which is mounted in the faucet itself and is easily removed for cleaning. The filter is intended for use in a faucet of the type having a removable cartridge member and is attached to a valve member carried by the cartridge member. By simply removing the cartridge, the filter can be easily cleaned or, if necessary, replaced.

SUMMARY OF THE INVENTION

Thus, in accordance with the present invention, there is provided, in a faucet of the type having a removable cartridge member receivable in an underbody member, said cartridge member carrying a cam member, at least one cam follower member and a valve member actuated by the cam follower member upon movement of the cam to control fluid communication between a spout and a source of water, the improvement comprising a filter member attached to said valve member and movable therewith within a passage in said underbody member through which water flows from said source, whereby large particles are prevented by said filter from entering said faucet.

Preferably the valve member has an axially extending projection terminated in an enlarged head portion and the filter member comprises an inner annular member, an outer annular ring member and a plurality of connecting members extending radially between the inner and outer annular members, the inner annular member having a through hole which tapers from a first diameter to a second diameter, the first diameter being substantially equal to that of the enlarged head portion and the second diameter being substantially equal to that of the projection whereby the inner annular member may be forced over the head portion whereafter it is releasably retained thereby on said projection.

The connecting members are preferably flat webs and have major surfaces generally aligned with planes extending radially through the inner and outer members.

BRIEF DESCRIPTION OF THE DRAWING

The invention will now be further described in conjunction with the accompanying drawings, in which.

DESCRIPTION OF THE PREFERRED EMBODIMENT

Figure 1:
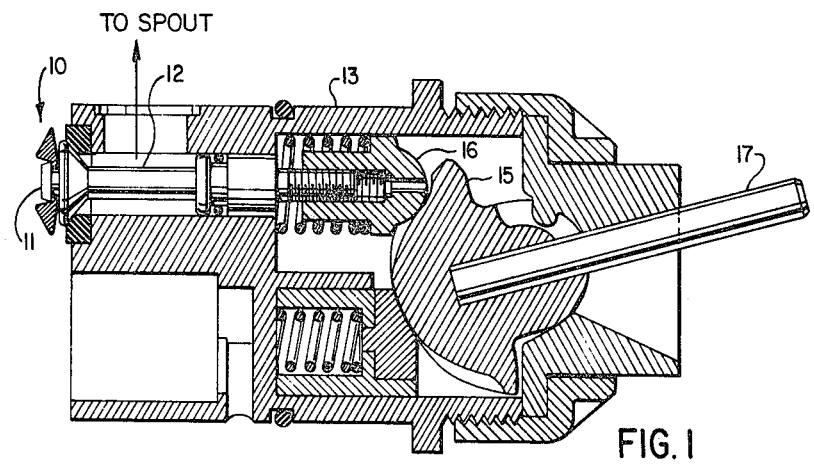
FIG. 1 shows a filter mounted on a valve member carried by a cartridge.

Referring to FIG. 1, there is shown a filter 10 according to the invention attached by forcing it over the enlarged head portion of projection 11 on the end of a valve member 12 in a cartridge 13. The cartridge 13 is removably received in an underbody member 14 (partly shown in FIG. 2) and carries a cam member 15 and a cam follower 16 (in practice there would usually be more than one, e.g. two). The valve member 12 is actuated by the cam follower 16 upon movement of the cam 15 to control fluid communication between a spout, not shown, and a source of water, also not shown. The cam 15 is moved by means of a rod 17 to which is attached a handle, not shown.

The cartridge structure shown in FIG. 1 is fully described in Canadian Pat. No. 1,007,141 of Keller, issued Mar. 22, 1977 and reference may be had to that Patent for further description of the structure and operation of the cartridge member.

Figure 2:
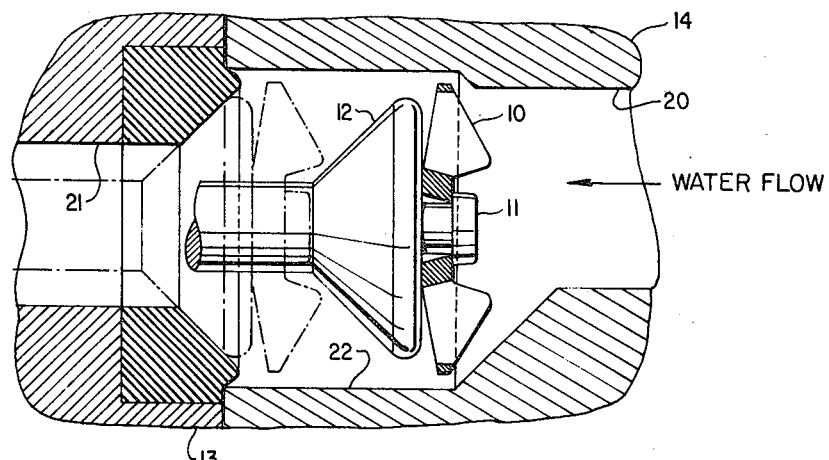
FIG. 2 is an enlarged view showing how the filter moves with the valve member within the underbody member.

Referring to FIG. 2, water enters inlet 20 in underbody member 14 and its passage into inlet 21 of the cartridge member 13 is controlled by the position of the valve member 12. The valve member 12, with attached filter 11, is drawn in solid line in the open position and in dash-dotted line in the closed position. As can be seen, the valve member 12 and filter 11 travel in a passage 22 in the underbody member 14. The filter 11 prevents large particles from entering the faucet via passage 21 in the cartridge.

Figure 3:
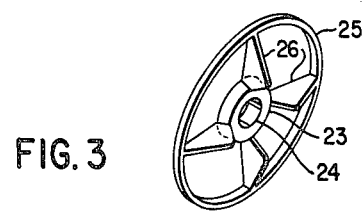
FIG. 3 is a perspective view of the filter itself.

As best seen in FIG. 3, the filter comprises an inner annular member 23 having a through hole 24 which tapers from a first (inner) diameter to second (outer) diameter. The inner diameter is about equal to or slightly larger than that of the enlarged head on projection 11 and the outer diameter is about equal to that of the projection whereby the inner annular member may be forced over the head portion whereafter it is releasably retained thereby on the projection. In other words, the filter and projection act as a "snap-fastener". The filter also comprises an outer annular ring 25 and a plurality of connecting members 26 extending radially between the inner and outer annular members. In the embodiment shown, the connecting members 26 are flat webs and have major surfaces generally aligned with planes extending radially through the inner and outer members.

It will be obvious that various modifications can be made to the filter. For example, the connecting members might be simply rod-like or the inner and outer annular members could be interconnected by a coarse screen.

What I claim as my invention is:

1. In a faucet of the type having a removable cartridge member receivable in an underbody member, said cartridge member carrying a cam member, at least one cam follower member and a valve member actuated by the cam follower member upon movement of the cam to control fluid communication between a spout and a source of water, a passage in said underbody member through which water flows from said source to said spout, the improvement comprising: (1) an axially extending enlarged head portion formed at one end of said valve member, (2) a filter member secured to said head portion of said valve member and movable therewith within said passage to prevent large particles from entering said faucet, (3) said filter member including an inner annular member having a through hole, whereby said filter member is secured to said head portion of said valve member by forcing said filter member over said head portion in a detachable manner so that the filter member can be easily removed.

2. In a faucet of the type having a removable cartridge member receivable in an underbody member, said cartridge member carrying a cam member, at least one cam follower member and a valve member actuated by the cam follower member upon movement of the cam to control fluid communication between a spout and a source of water, the improvement comprising:

(a) a filter member attached to said valve member and movable therewith within a passage in said underbody member through which water flows from said source whereby large particles are prevented by said filter from entering said faucet, (b) said valve member having an axially extending projection terminating in an enlarged head portion, (c) said filter member comprising an inner annular member, an outer annular ring member and a plurality of connecting members extending radially between the inner and outer annular members, (d) said inner annular member having a through hole which tapers from a first diameter to a second diameter, (e) said first diameter being substantially equal to that of the enlarged head portion and said second diameter being substantially equal to that of said projection whereby the inner annular member may be forced over the head portion so that it is releasably retained thereby on said projection.

3. The improvement as claimed in claim 2 wherein the connecting members are flat webs and have major surfaces generally aligned with planes extending radially through said inner and outer members.

* * * * *